L. B. SMITH.

WIRE-FENCE.

No. 7,136. Reissued May 23, 1876.

WITNESSES

Mary J. Otley.

Geo. E. Upham.

INVENTOR

Lucien B. Smith,

Chipman & Brown & Co

ATTORNEYS

THE NORRIS PETERS CO., PHOTO-LITHO., WASHINGTON, D. C.

UNITED STATES PATENT OFFICE.

LUCIEN B. SMITH, OF KENT, OHIO.

IMPROVEMENT IN WIRE FENCES.

Specification forming part of Letters Patent No. 66,182, dated June 25, 1867; Reissue No. 7,136, dated May 23, 1876; application filed February 13, 1875.

*To all whom it may concern:*

Be it known that I, LUCIEN B. SMITH, of Kent, in the county of Portage and State of Ohio, have invented certain new and useful Improvements in Wire Fences; and I hereby declare that the following is a full, clear, and exact description of the construction and operation of the same, reference being made to the accompanying drawings, making a part of this specification, and to the letters and figures of reference marked thereon.

Figure 1:
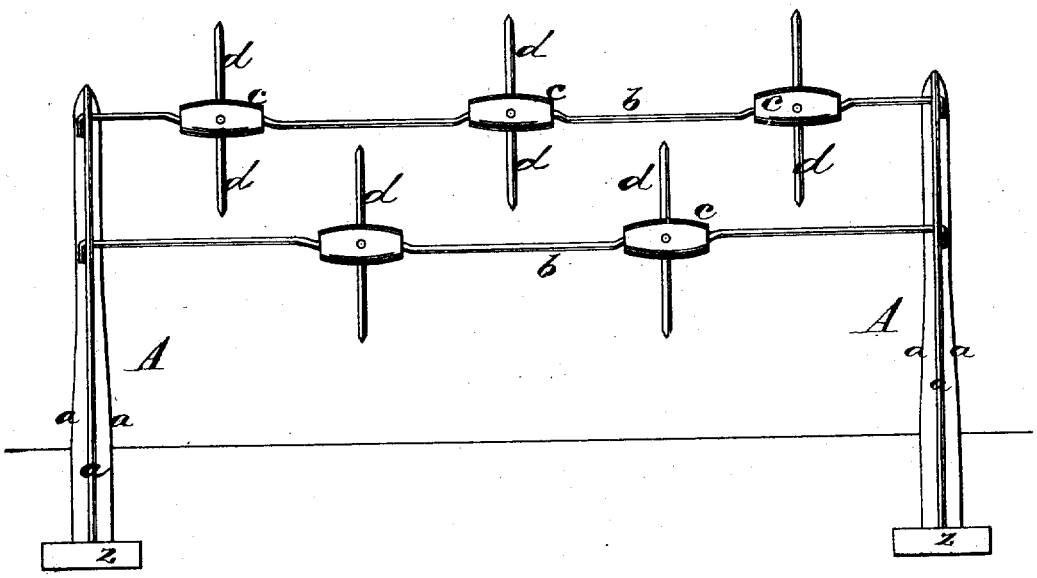
Figure 2:
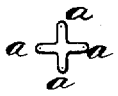
Figure 3:
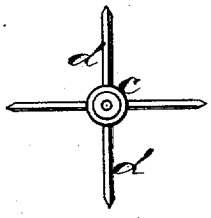

Figure 1 is a side view of a panel or length between my improved wire fence. Fig. 2 is a cross-section of a post, and Fig. 3 an end view of one of the protecting-spools detached.

This invention relates to fences formed of wire and provided with barbs or spurs at suitable distances apart to deter animals from rubbing against or breaking through; and it consists in providing the wires forming the panels with suitable bends or depressions, whereby the barbs or spurs are prevented from moving lengthwise upon the wires.

A represents posts of suitable form, and set the desired distance apart. C D represent the barbs or spurs, which may be constructed in any desired form to allow the wire forming the panels to pass through them. The letter *b* represent the wire, which is held in position by the posts A. At suitable distances apart upon the wire the barbs are placed and held in position by bending or depressing the wire, and thereby forming shoulders upon each side of the barb or spur, so that the barb or spur is held securely from any lengthwise movement upon the wire, which is an indispensable feature in the use of barbed-wire fences.

Another important result is attained by bending the wire as above mentioned—namely, provision is thereby made for the contraction of the wire in extremely cold weather. The bends in the wire will partially straighten without disturbing the posts, but not sufficiently to allow the barbs to move from their positions.

I lay no claim, in this application, to anything appertaining to the fence-post shown in the drawings, as said post forms the basis of a separate application now pending in the Patent Office; but,

Having thus fully described my invention, what I claim, and desire to secure by Letters Patent, is—

In a wire fence, the bent wires forming the panels, in combination with a barb, whereby the barb is prevented from moving lengthwise upon the wire, for the purpose set forth.

In testimony that I claim the above I have hereunto subscribed my name in the presence of two witnesses.

LUCIEN B. SMITH.

Attest:

BENJ. A. MASSEY,
JOHN S. PHELPS.